United States Patent [19]
Katz et al.

[11] 3,889,333
[45] June 17, 1975

[54] FAST EXCHANGE CLAMPING DEVICE FOR ROTARY TOOLS

[75] Inventors: Otto Katz, Bildechingen; Heinrich Tischinger, Unterer Augsbaum, both of Germany

[73] Assignee: Ledermann & Co., Horb, Germany

[22] Filed: Apr. 22, 1974

[21] Appl. No.: 462,640

[30] Foreign Application Priority Data
Apr. 25, 1973 Germany............................ 2320919

[52] U.S. Cl.................. 29/104; 29/105 R; 83/666; 90/11 A; 144/237
[51] Int. Cl....... B26d 1/12; B23c 1/00; B27g 13/00
[58] Field of Search.............. 29/104, 105 R, 103 R; 144/236, 237; 90/11 A; 83/838, 839, 840, 842, 844, 666

[56] References Cited
UNITED STATES PATENTS

| 519,892 | 5/1894 | Newton | 83/666 |
|---|---|---|---|
| 646,284 | 3/1900 | Hilton | 29/105 R |
| 2,051,965 | 8/1936 | Roth | 90/11 A |
| 2,968,859 | 1/1961 | Garnett | 29/105 R |
| 3,185,494 | 5/1965 | Dziedzic | 90/11 A |
| 3,566,506 | 2/1971 | Wolf | 29/105 R |
| 3,805,661 | 4/1974 | Tuomaala | 83/666 |

*Primary Examiner*—Harrison L. Hinson
*Attorney, Agent, or Firm*—Walter Becker

[57] ABSTRACT

A fast exchange clamping device, or chuck, for rotary tools in which a support body adapted for connection to a spindle has a tool engaging surface perpendicular to the axis of rotation to engage one side of a rotary tool concentric with the axis. Clamping means in the form of bolt means extend perpendicularly from the tool engaging surface of the support body and includes head means releasably engageable with the side of a tool which faces away from the surface on the support body. The clamping means is moveable axially in the support body and is spring biased toward tool clamping position and is selectively moveable into tool releasing position.

21 Claims, 15 Drawing Figures

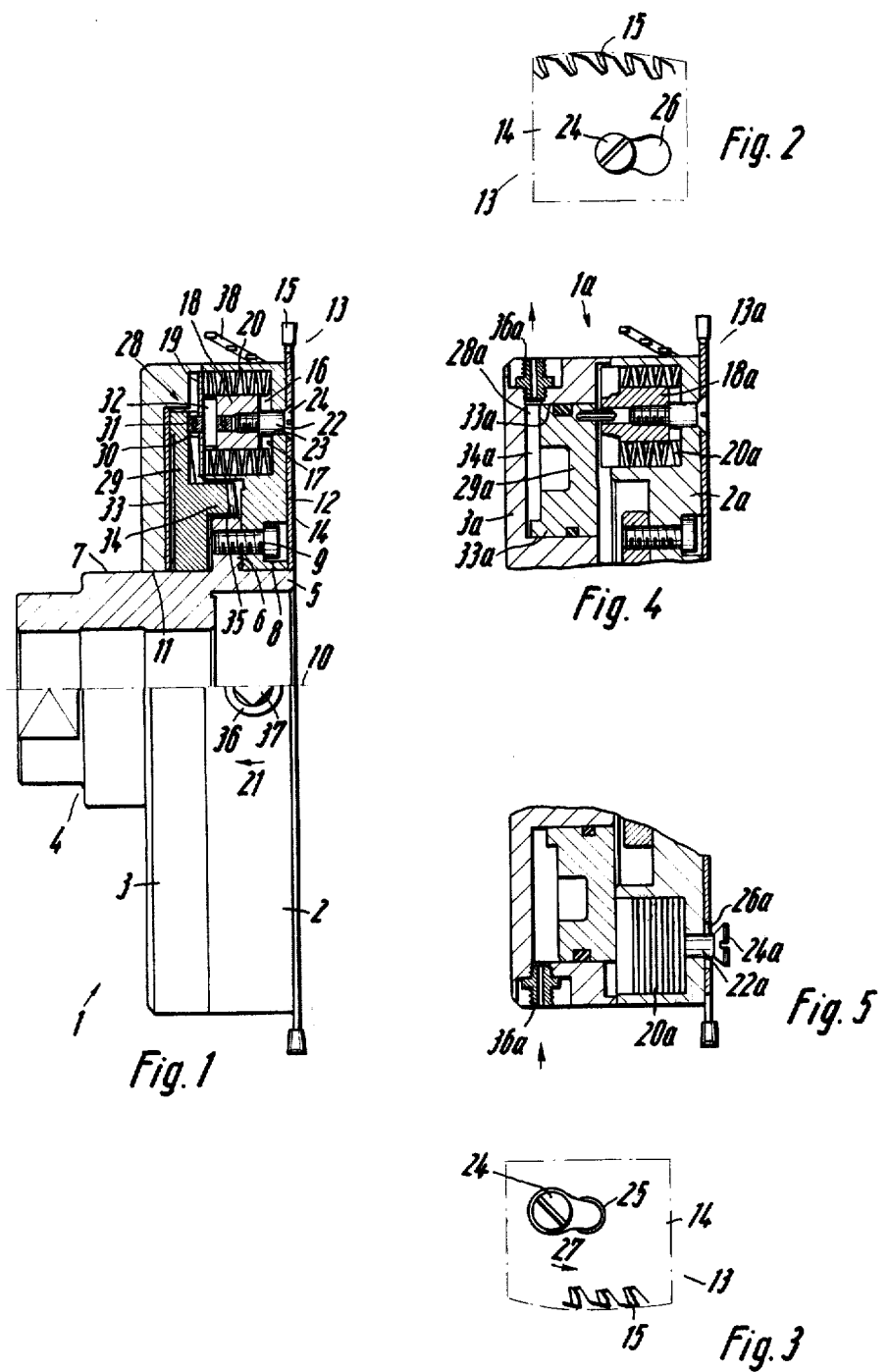

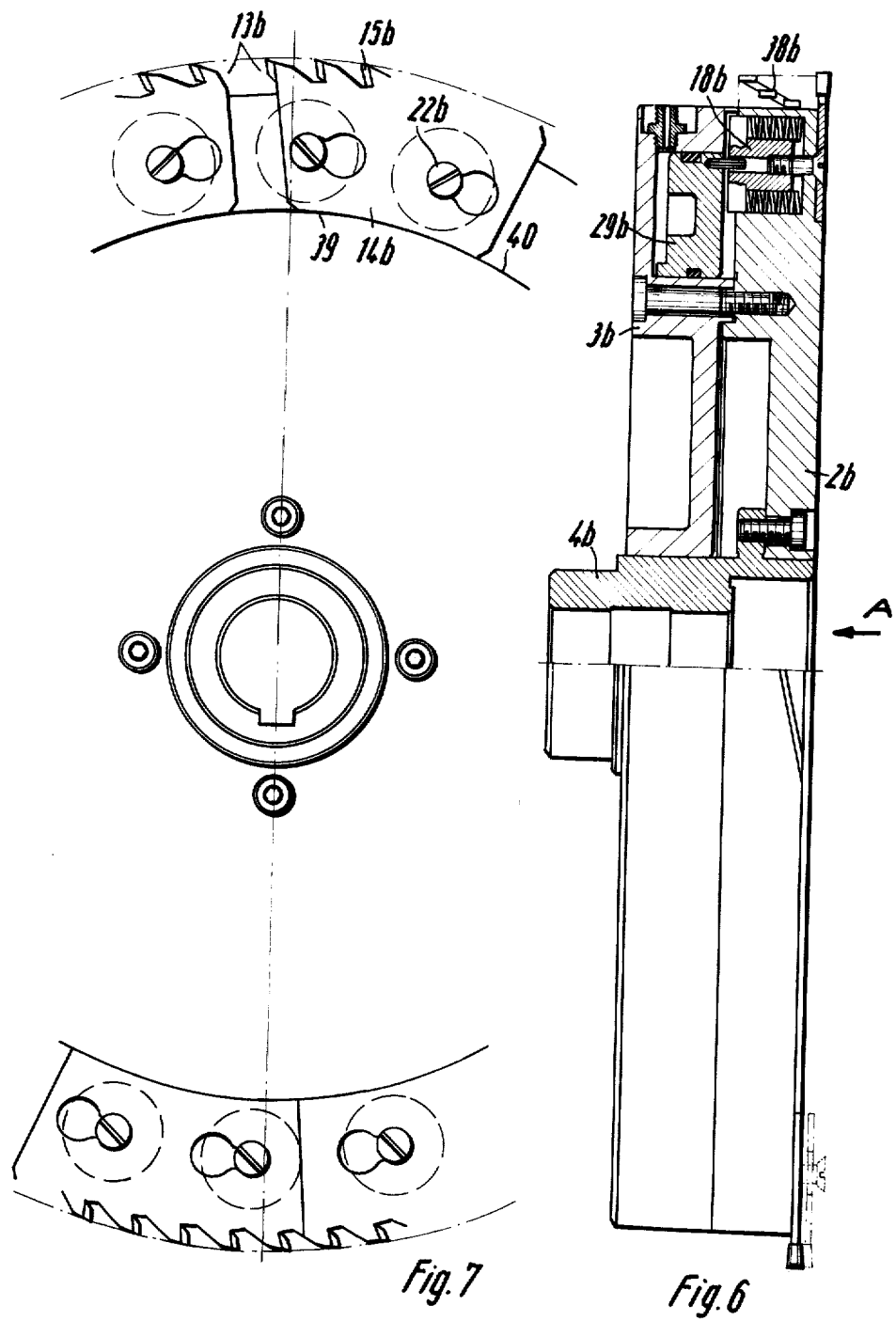

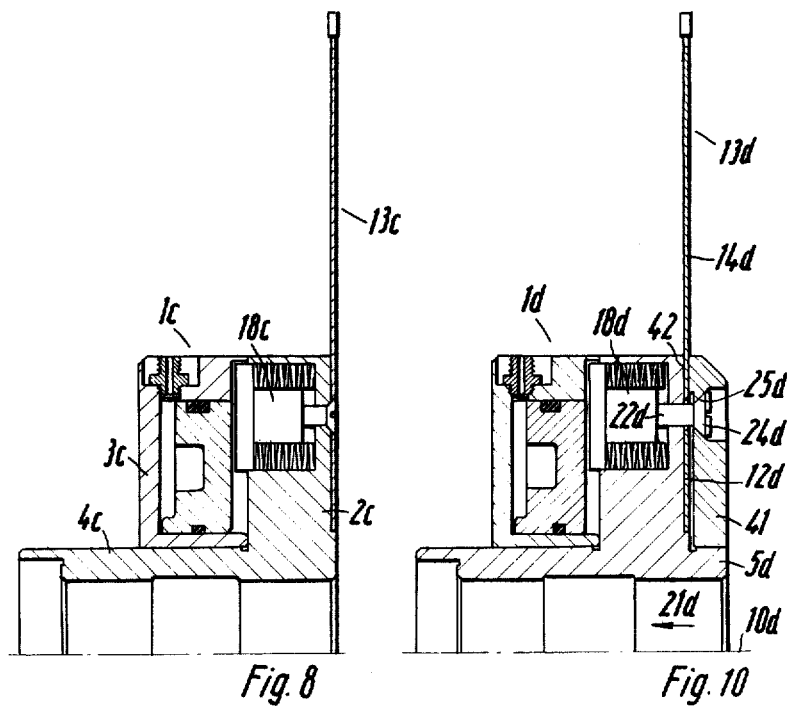

FAST EXCHANGE CLAMPING DEVICE FOR ROTARY TOOLS

The present invention relates to a fast exchange clamping device for rotary tools with a support to be arranged on a machine spindle, or the like, which support comprises a counterclamping surface for engagement by the tool body with the counterclamping surface pointing against the clamping direction while on said support there is provided at least one clamping element movable in clamping direction, said clamping element including a holding element detachably and in clamping direction positively engaging the tool body.

It is an object of this invention so to design a clamping device of the above mentioned general type that with a simple construction and short tool exchange times, a very safe holding of the respective tool will be assured.

These and other objects and advantages of the invention will appear more clearly from the following specification, in connection with the accompanying drawings, in which:

FIG. 1 illustrates partially in view, and partially in axial section a fast exchange clamping or chucking device according to the present invention.

FIG. 2 is a cutout of FIG. 1 as seen from the right-hand side of FIG. 1.

FIG. 3 shows a cutout similar to that of FIG. 2, but in disengageable position.

FIG. 4 illustrates a modified clamping device according to the invention in clamping or chucking position similar to FIG. 1.

FIG. 5 shows the arrangement of FIG. 4, but in disengaged position.

FIG. 6 represents a further development of a clamping device according to the invention, and illustrated in a manner similar to that of FIG. 1.

FIG. 7 shows the device of FIG. 6, as seen in the direction of the arrow A of FIG. 6.

FIG. 8 illustrates in axial section still another embodiment of the present invention.

FIG. 9 is a cutout of FIG. 8, as seen from the right-hand side thereof.

FIGS. 10–13 respectively illustrate two further embodiments of the invention in an illustration similar to that of FIGS. 8 and 9.

Figure 14:
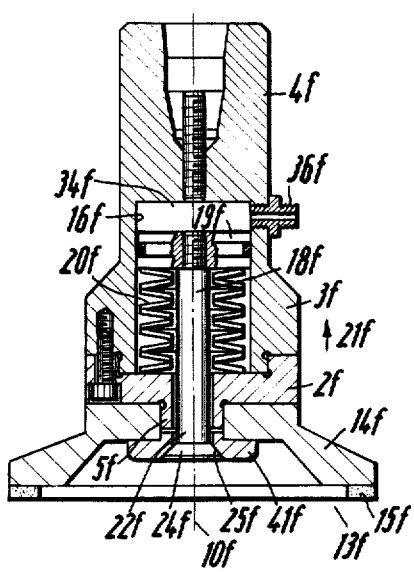

FIG. 14 shows in axial section a clamping or chucking device for a grinding tool.

Figure 15:
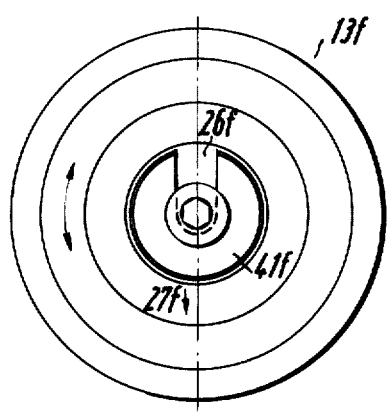

FIG. 15 is an axial view of the chucking device of FIG. 14.

The fast exchange chucking device according to the present invention is characterized primarily in that the clamping member in clamping direction and against a lifting device is under the load of a load member, and is furthermore characterized in that when said clamping member is in disengaging position and rests against the lifting device, the connection between the clamping member and the tool body as it is formed by the holding member is designed as an easily disengageable positive connection.

The positive connection may, therefore, be so designed that in clamping position it will practically in every direction act in a positive nondisengageable manner whereas said positive connection in the disengaging position of the clamping member rests in a disengaged position which permits a very easy complete disengagement.

The fast exchange clamping device according to the invention is particularly well suitable for tools operating in a chipless and chip-removing manner for machining wood, synthetic material, metal and stone. In particular, when employing mechanical springs, even in case of failure of the energy supply, the clamping of the tool will be safely maintained. The clamping device is, when machining wood, particularly suitable for devices which machine the edges, for dividing devices as well as for the combination of tools. The clamping device according to the invention is, however, also suitable for a fast exchange of grinding bodies on tool grinding devices. Furthermore, the clamping device may be employed for chucking the separating discs for the machining of stones.

Referring now to the drawings in detail, and FIG. 1 thereof in particular, a fast exchange clamping device or chuck according to the invention comprises a support or chuck 1, which includes primarily an annular flange disc 2, a housing body 3 of the same diameter, which is connected to the rear end face of said flange disc 2, and a hub flange 4. Flange 4 serves for connecting the support 1 to a machine spindle, or the like, and has a considerably smaller diameter than flange disc 2. The hollow hub flange 4 has its front end provided with a cylindrical centering extension 5 which merges with an annular collar 6 projecting beyond the outer circumference of hub flange 4. That side of the annular collar 6 which faces away from the centering extension 5 is provided with a cylindrical section 7 having the same outer diameter as the centering extension 5. Flange disc 2 is, by means of its bore 8, centered and placed on the centering extension 5, and with screws 9 uniformly distributed around the tool axis 10, is clamped against the front end face of collar 6 in such a way that it has its front end face slightly set back relative to the front end face of the centering extension 5. The pot-shaped housing body 3, which is similar to the flange disc 2, is by means of its bore 11 centrally guided on the section 7 of the hub flange 4 and by means of nonillustrated countersunk screws uniformly distributed about the tool axis 10 is clamped against the rear end face of the flange disc 2 in such a way that a housing is formed which is nearly completely closed toward the outside.

The front end face of the flange disc 2 and thus of the support 1 forms a plane counterclamping surface 12 for a tool 13. This tool may, for instance, have an annular plane leaf-shaped tool body 14 and cutting teeth 15 on a tooth ring, said teeth 15 being formed by hard metal elements on the outer circumference of the tool body 14. The diameter of the tooth ring is only slightly greater than that of the support 1. This tool 13 is particularly suitable for cutting-edging circular saw blades for the machining of wood. The tool body 14 has a bore by means of which it is, in a centered manner, guided on the centering extension 5 in such a way that its front end face is located in the plane of the front end face of the centering extension 5.

The flange disc 2 is provided with a plurality, for instance four, blind bores 16 which are uniformly distributed about the tool axis 10 and located directly adjacent to the outer circumference of the support 1. The diameter of the bores 16 approximately equals one-sixth of the outer diameter of the support 1. The bores 16 are open toward the rear end face of the flange disc 2 in such a way that the bores 16 which are axis-parallel to the tool axis 10, have their bottom surfaces 17 arranged directly adjacent to the counter-clamping surface 12. In each bore 16 there is guided a bolt-shaped cylindrical clamping member 18, the main section of which has a diameter which is approximately half as long as the diameter of the bore 16. The cylindrical clamping member 18 has its rear end facing away from the counterclamping surface 12 and is provided with a collar 19 which may be slidably guided in bore 16. Arranged around the main section of each clamping member 18 is a packet 20 of dish springs. The dish spring packet rests on one hand on the bottom surface 17 of bore 16 and on the other hand rests against that end face of collar 19 which faces said bottom surface 17. The arrangement is such that the clamping member 18 is spring loaded or urged toward the rear end of support 1 in clamping direction indicated by arrow 21. The load member may also be formed by pneumatic or hydraulic pressure fluid cylinders, or the like, so that a hydrostatic force engages the clamping member. A screw bolt is as holding member 22 detachably screwed into each clamping member 18 and more specifically into a threaded bore which is located in the axis of the respective clamping member 18 and at the front end face thereof. Each holding member 22 adjacent to the threaded section has a cylindrical shank portion of increased diameter, which shank portion is clamped against the front end face of the clamping member 18 and by means of a bore 23 having approximately the same diameter is guided in the flange disc 2 at the front end face thereof so that the clamping member 18 may be mounted sealed toward the outside. That end of each holding member 22 which faces away from the clamping member 18 is provided with truncated cone-shaped slotted countersink head 24 which is located within the region of the counter clamping surface 12.

At any rate it is advantageous when the holding member is disengageably connected to the clamping member, preferably by means of a screw threaded section. Due to the disengageability, the holding member 22 can likewise for adapting the clamping device to different tools be exchanged. The safety of the tension is greatly improved by, for each holding member, providing a separate clamping member and/or a separate load member.

Each head 24 forms a positive member having as positive closing opening associated therewith a countersink opening arranged directly in the tool body 14 so that when in clamping position, the front end face of the head 24 is flush with the front end face of the tool body 14. The positive connection 24, 25 is, for improving the holding power, located closer to the working range of the tool than to the tool axis 10, preferably directly adjacent to the outer circumference of the tool. It is, however, also possible to provide the fast exchange clamping device according to the invention, not only for rotary tools, but also for such tools which, for instance, carry out a rectilinear or other working movement, or a reciprocatory working movement.

The opening 25 merges in conformity with FIGS. 2 and 3 in a bayonet closing manner at one side with a passage 26, the diameter of which is greater than the maximum diameter of the head 24 and which is spaced from the tool axis 10 by the same radial distance as the opening 25. In order to weaken as little as possible the pertaining member of the clamping device in its cross section, and furthermore in order to be able to provide said opening 25 at any desired place, the through opening is, in addition to the area where it merges with the positive opening, substantially completely limited at the circumference. All openings 25 are, with reference to the direction of rotation, located around the tool axis 10 on the same side of the respective pertaining passage 26, so that by turning the tool 13 in a disengaging direction indicated by arrow 27, the heads 24 of all holding members 22 may from their respective pertaining positive engaging opening 25 be brought into the pertaining passage 26 whereupon the tool 13 can axially be withdrawn from the support 1 or from the counterclamping surface 12. The disengaging direction indicated by arrow 27 is selected as being equal to the direction of rotation of the tool during the working movement so that when working with the tool, the torque can be transmitted to the tool body 14 by the holding member 22 in a positive manner. This is due to the fact that the heads 24 abut against those end surfaces of the openings 25 which face away from the passage openings 26. Due to the design of the bolt heads as flat heads or countersink heads, a centering of the tool body 14 relative to the support 1 is obtained so that the centering at the centering extension 5 may be omitted. With a clamping tool 13 the latter is by engagement with the heads 24 on the openings 25 uniformly clamped by the force of the load members 20 with its inner surface against the countersurface 12 of the support 1. In this condition, the tool cannot be turned relative to support 1 in disengaging direction indicated by arrow 27, and the holding members 22 are merely subjected to pull stresses.

Due to the fact that the clamping force is determined by the load member or load members 20, the tool exchange can also be effected by less qualified personnel. At any rate, due to the load members 20, a tension will be assured which is equalized to all sides. However, positive connections 24, 25 may be arranged on a plurality of pitch circles, for instance, in a helical manner.

In order to be able, for purposes of disengaging or connecting the tool to turn the tool relative to the support 1, there is provided a lifting-off device 28 which is located substantially within the housing body 3. The device 28 comprises a cam disc 29 which is located along the axis 10 and which is rotatably mounted on section 7 of the hub flange 4 for rotating about the tool axis 10. The device 28 has that end face thereof which faces toward the clamping members 18, provided with a number of cams 30 which ascend in circumferential direction along an incline and correspond in number to the number of the clamping members 18. One cam 30 each is located within the range of each clamping member 18 and is spaced from the tool axis 10 by a distance which, at least approximately, equals the distance of the axes of the clamping member 18 from the tool axis 10. On each clamping member 18 which is nonrotatably secured relative to the support 1, for instance, by a pin engaging a slot, there is journaled a ball bearing 31 with a pin 32. The axis of the respective ball bearing 31 intersects the tool axis 10 at a right angle, while the central plane of the respective ball bearing which central plane is located at a right angle to the axis of the ball bearing is located in an axial plane of the pertaining clamping member 18. The respective pin 32 is pressed into a diametric bore of the respective pertaining clamping member 18 while this bore with half of its diameter extends into the pertaining collar 29 and the ball bearing 31 projects beyond the rear surface of the pertaining clamping member 18, or pertaining collar 19. When the end face cam disc 29 turns around the tool axis 10, and cams 30 which ascent in a wedge-shaped manner move onto the outer rings of the ball bearing 31 whereupon in the first course the clamping members 18 are by the ball bearings 31 rolling on the cam 30 displaced in the direction of the arrow 21 against the force of the load member 20 in a direction counter to the clamping direction indicated by the arrow 21 whereby the heads 24 are lifted off the openings 25. The cam disc 29 rests with that of its end faces which faces away from the clamping members 18 on a sliding disc 33 which may consist, for instance, of synthetic material. This disc 33 rests against the inner end face of the housing body 3 in a plane manner. Resting against said disc 33 is the cam plate 29 merely with a relatively narrow annular surface formed by a protruding collar, said annular surface being spaced from the tool axis 10 by approximately the same distance as the cam 30. In clamping position, according to FIG. 1, the collars 19 of the clamping members 18 can be moved up to and in the housing body 3, because the inner diameter of said housing body 3 is, within the range of its end face which faces the flange disc 2, slightly greater than twice the distance of the axes of the clamping members 18 from the tool axis 10 plus the diameter of the bores 16 or collars 19.

The cam disc 29 is, on that end face thereof which faces toward the flange disc 2, provided with a projecting gear ring 34 which has teeth at the end face. The gear ring 34 extends between an outer annular zone of the flange disc 2 which comprises the bores 16, and the annular disc collar 6 in such a way that it reaches nearly to the plane of the front end face of said collar 6. The teeth 35 of this gear ring 34 are in mesh with a pinion 36, the axis of which intersects the tool axis 10 at a right angle, and which is mounted in a completely countersink manner in the center of the axial extension of the flange disc 2 on the latter. The outer end of said pinion is provided with a wrench opening, or the like, which is formed, for instance, by an inner square. By turning the pinion 36 with a suitable wrench, the cam disc 29 of the lifting-off device 28 can thus be turned, whereby all clamping members 18 can simultaneously be moved into disengaging position.

With the illustrated embodiment, the flange disc 2 itself forms a tool while the flange disc 2 between the bores 16 at an incline to the tool axis 10 has slots which are located at the circumference and intended for tool inserts 38. The maximum working diameter of said inserts 38 is slightly less than the diameter of the tool 13, said tool inserts 38 serving as cutters. The tool inserts 38 are formed by blade-shaped tool bodies which are inserted into the respective slot and have hard metal teeth. The hard metal teeth are, by means of clamping keys, disengageably clamped in the slots of the flange disc 2, and when looking transverse to the tool axis 10 in conformity with FIG. 1 are located between the rear end surface of the tool 13 and the end surface of flange disc 2.

In FIGS. 4–15, there are employed for corresponding parts shown therein the same reference numerals as in FIGS. 1–3, but in FIGS. 4 and 5 with the additional character "a", and in FIGS. 6 and 7 with the additional character "b", and in FIGS. 8 and 9 with the additional character "c", etc.

The embodiment of FIGS. 4 and 5 differs from that of FIGS. 1–3, primarily merely in that the lifting-off device 28a is designed as a pneumatic lifting device. To this end, the housing body 3a forms it its interior an inner and an outer cylindrical cylinder path 33a for an annular piston 29a which is adapted to move on against the rear end surfaces of the clamping members 18a while that cylinder space 34a which faces away from the clamping members 18a is connected to a connecting nipple 36a which is arranged in a countersink manner on the outer circumference of the housing body 3a. A nonillustrated pressure conduit may be connected to the nipple 36a. When the cylinder chamber 34a is, through the connecting nipple 36a, acted upon by a pressure medium, the piston 29a is moved against the clamping members 18a so that the latter, against the thrust of the dish spring packed 20a, is in conformity with FIG. 5 moved into its disengaging position. Separate connecting nipples 36a, or a common connecting nipple, may be provided for conveying pressure fluid to the cylinder chamber 34a and for emptying the same.

While with the embodiment of FIGS. 1–5 the tool 13 is formed by a one-piece body, with the embodiment of FIGS. 6 and 7, the tool is formed by individual segments 13b which are uniformly distributed over the circumference of the tool and which respectively have a plurality of teeth 15b, and in circumferential direction of the tool are located in spaced relationship to each other or engage each other so that this design is particularly suitable for large tools. For the tool body 14b of each tool segment 13b there are provided two holding members 23b which are spaced from each other in circumferential direction. Those inner surfaces of the tool body 14b which face toward the tool axis 10b are circularly concavely curved about the tool axis 10b. The flange disc 2b has a corresponding annular shoulder 40 for engaging said inner surface 39 of the segments 13b in a centering manner.

With the embodiment according to FIGS. 8 and 9, the flange 2c forms one piece with the hub flange 4c. This is particularly advantageous in cases where the lifting-off device is formed by a pressure fluid-operable cylinder piston system because in such an instance the housing body 3c which forms the cylinder moving paths can be mounted in a simple manner.

With the embodiment according to FIGS. 8 and 9, the outer diameter of the tool 13 is considerably greater than that of the support 1c so that this tool is particularly suitable for dividing systems.

The embodiment of FIGS. 10 and 11 differs from that of FIGS. 8 and 9, primarily in that the openings 25d for the countersink heads 24d of the holding members 22d are not provided in the tool body 14d, but in a separate annular disc-shaped holding body 41. This body 41 is located on that side of the tool body 14d which faces away from the counterclamping surface 12d and within the region of its outer circumference has radially outside the opening 25d an axially protruding annular clamping surface 42 for engagement with the outer end face of the tool body 14d. Each opening 25d has a passage 26d so that after displacement of the clamping members 18d against the clamping direction, arrow 21d, the holding body 41 can be turned in disengaging direction, indicated by arrow 27d and can then be lifted off from the holding members 22d. The tool body 14d of the tool 13d has merely through bores for the countersink heads 24, while the diameter of these bores is greater than the maximum diameter of the heads 24d so that after removal of the holding body 41, also the tool 13d can easily axially be removed from the support 1d. Since thus the holding members 22d do not directly engage the tool body 14d, this embodiment is particularly well suited for tools with very thin or weak tool bodies. The centering extension 5d of the support 1d will with this embodiment serve for receiving in a centering manner the bore of the holding body 41, whereas for the bore of the tool body 14d there is provided an annular shoulder which is adjacent to the centering extension 5d and which has a slightly greater diameter than the centering extension 5d.

For purposes of simplifying the assembly for all holding members 22d there is provided a common annular disc-shaped holding body 41 which is located in the tool axis 10d. It is also possible that the easily disengageable positive closing connection is provided between the holding member and the clamping member so that during a tool exchange, the holding member can be disconnected from the clamping member and as a result thereof the tool body can be lifted off.

Figure 12:
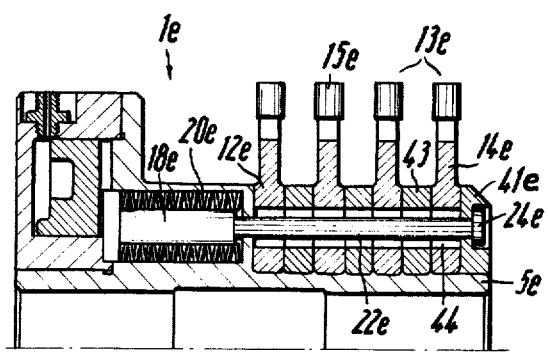
Figure 13:
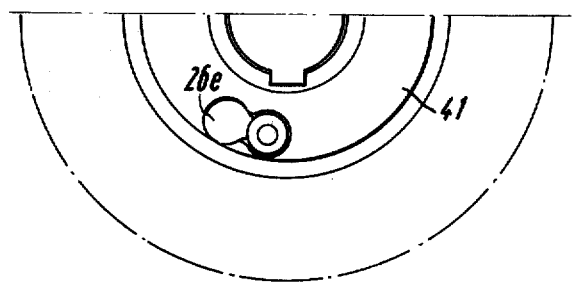

As will be seen from FIGS. 12 and 13, the fast exchange clamping device according to the present invention is also suitable for clamping a plurality of tools 13e which are axially adjacent to each other and which may be of the same or different design and which are spaced from each other, for instance, by spacer rings 43. With this embodiment of the invention, the innermost tool 13e rests against the counterclamping surface 12e, whereas the holding body 41e rests against the outermost tool 13e. By means of the holding body 41e, all tools 13e are axially clamped together and against the counterclamping surface 12e. For all tools 13e, the same correspondingly long holding members 20e are provided, the heads 24e of which are with this embodiment of cylindrical shape so that they do not take on any centering function. The tools 13e are exclusively centered by the centering extension 5e, relative to the support 1e. The tool bodies 14e as well as the spacer members 43 are provided with bores 44 for the heads 24e, said bores 44 being in alignment with each other. In this way, following the removal of the holding body 41e, the tools and spacer members can be withdrawn without any difficulties.

With the embodiment according to FIGS. 14 and 15, the clamping member 18f is located in the tool axis 10f, while said clamping member 18f is formed by a section of the shank of the holding member 22f. The outer thread section of said holding member 22f is screwed into the collar which is directly designed as piston 19f. Piston 19f is displaceably mounted in the bore designed as cylinder moving path 16f. This path 16f is provied in housing body 3f which forms one piece with the hub flange 4f and is closed at its front end face by the flange disc 2f against which the leaf spring packet 20f rests. A connecting nipple 36f returns into the rear cylinder chamber 34f in such a way that the clamping member 18f together with the holding member 2f can be moved hydraulically or pneumatically against the clamping direction indicated by the arrow 21f. For instance, the tool body 14f of a grinding tool 13f may, in a centered manner, be placed upon the centering extension 5f of the flange disc 2f. The grinding tool 13f may, for instance, be designed as a cup wheel which at its outer end face is provided with a depression in which the holding body 41f is located. The annular holding body 41 located along the tool axis 10f is, with this embodiment, provided with an opening 25f which serves as countersink bore and merges on one side with the passage 26f which in an unlimited manner extends to the outer circumference of the holding body 41f and with the opening 25f forms a slot so that the disengaging movement of the holding body 41f is directed at a right angle to the tool axis 10f in the direction indicated by the arrow 27f. In this way, a very simple insertion and removal of the positive connecting member can be realized.

The lifting off or the movement of the clamping members may also be effected by a plurality of pistons. When employing a plurality of clamping members, the latter are expediently arranged along a pitch circle about the tool axis. However, it is also possible to provide clamping members on a plurality of pitch circles of different sizes around the axis of the tool.

It is, of course, to be understood that the present invention is, by no means, limited to the specific showing in the drawings, but also comprises any modifications within the scope of the appended claims.

What is claimed is:

1. In a quick exchange chucking device for rotary tools; a support means having a central axis and adapted for being driven in rotation on said axis, said support means having a surface perpendicular to said axis for engaging a tool, clamping means on said support means protruding axially through said surface and axially moveable on said support means, said clamping means having clamp surface means thereon facing said surface on said support means whereby a tool disposed between said surface on said support means and said clamp surface means on said clamping means can be clamped to said support means by axial movement of said clamping means on said support means, spring means in said support means biasing said clamping means in tool clamping direction, means for moving said clamping means in tool releasing position, and cooperating elements of a disengageable connection on said tool and said clamping means to permit removal of the tool when said clamping means are moved into tool releasing position.

2. A device according to claim 1 in which the disengagement of the tool from the clamping means is accomplished by relative rotation of the tool and support means.

3. A device according to claim 1 in which said clamping means comprises a plurality of clamp members distributed in the peripheral direction of said support means and radially spaced from the axis thereof, each clamp member having a head on the outer end, said tool having circumferentially extending key hole slots therein with the larger ends adapted to receive the heads of said clamp members.

4. A device according to claim 3 in which said slots are formed directly in the tool, the head on each clamp member being tapered, the narrow portion of each slot at the closed end having a tapered seat to receive a respective clamp member head.

5. A device according to claim 1 in which said clamping means includes a further member separable from the clamping means and having said clamp surface means formed thereon, said support means and said further member having interengaging axial surfaces concentric with said axis to center the further member on said support means.

6. A device according to claim 1 in which said clamping means comprises a plurality of bolts extending perpendicularly into said support means through said surface and having tapered heads on the outer ends, said bolts being radially spaced from said axis and distributed circumferentially in said support means, and a spring acting on each bolt to move the head thereof toward said surface.

7. A device according to claim 6 in which said disengageable connection includes a slot for each bolt having a tapered countersink region for receiving a respective bolt head.

8. A device according to claim 6 which includes an actuating member in said support means for each bolt, said spring for each bolt engaging one side of the respective actuating member, means in the support means for engagement with the other side of each actuating member to move the bolts in releasing direction, and each bolt threadedly engaging the respective actuating member.

9. A device according to claim 8 which includes recesses formed in said support means for said actuating members, each recess having a bottom spaced from said surface on said support means, and bores in said support means through which said bolts are guided into the respective recesses.

10. A device according to claim 9 in which said support means comprises a main body part and an annular flange mounted in centered position thereon, said annular flange on one side forming said tool engaging surface and said recesses extending into said flange from the other side.

11. A device according to claim 10 in which each actuating member has a collar on the end remote from the bottom of the respective recess, each spring comprising a pocket of spring washers surrounding the respective actuating member and at one end engaging the bottom of the respective recess and at the other end engaging the collar of the actuating member.

12. A device according to claim 11 which includes release means engaging all of said actuating members and operable for moving all of said actuating members simultaneously in releasing direction.

13. A device according to claim 12 in which said release means comprises a rotary cam in said support means having a cam portion for each actuating member, and means operable from externally of said support means for rotating said cam to move said actuating members between tool releasing and tool clamping positions.

14. A device according to claim 12 in which said release means comprises a fluid operable annular piston in said support means, said piston engaging all of said actuating members.

15. A device according to claim 1 in which said means for moving said clamping means in tool releasing direction comprises a cam in said support means.

16. A device according to claim 1 in which said means for moving said clamping means in tool releasing direction comprises a fluid operable piston in said support means.

17. A device according to claim 1 in which said support means comprises a hub portion having means for connection to a spindle, an annular flange connected to the hub portion and one side thereof forming said tool engaging surface, and a back plate centered on said hub portion and engaging the other side of said annular flange.

18. A device according to claim 3 which includes a tool in the form of circumferential segments, each segment engaging an adjacent pair of said clamp members and being supported and located on said support means thereby.

19. A device according to claim 1 in which said support means has a peripheral surface concentric with said axis, and tool means mounted on the peripheral surface of said support means and extending radially outwardly therefrom.

20. A device according to claim 1 in which said clamping means is a single bolt on the axis of said support means, a head on the outer end of said bolt, a clamp disc forming a part of said clamping means and having a radial slot for receiving the shank of said bolt and a countersink recess in the center to receive the head of the bolt, the side of said disc facing said support means forming said clamping surface, and a central flange protruding axially from said support means on which a tool is adapted to be mounted, said central flange being larger in diameter than the bolt head and smaller in diameter than said disc.

21. A device according to claim 1 in which said clamping means comprises a plurality of bolts extending perpendicularly into said support means through said surface and having heads on the outer ends, said bolts being radially spaced from said axis and distributed circumferentially in said support means, and a spring acting on each bolt to move the head thereof toward said surface, a further member releasably engaging said bolt heads, and a plurality of tools in stacked relation between said tool engaging surface and said further member.

* * * * *